(12) United States Patent
Whalen (10) Patent No.: US 8,534,736 B1
(45) Date of Patent: Sep. 17, 2013

(54) CARGO LID SYSTEM FOR A VEHICLE

(75) Inventor: Kelly Whalen, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/432,510

(22) Filed: Mar. 28, 2012

(51) Int. Cl.
*B60R 11/00* (2006.01)

(52) U.S. Cl.
USPC .................................. 296/37.16; 296/37.14

(58) Field of Classification Search
USPC ............ 296/37.14, 37.16, 37.2, 37.3, 100.06, 296/100.07
See application file for complete search history.

(56) References Cited

U.S. PATENT DOCUMENTS

| | | | | |
|---|---|---|---|---|
| 2,160,958 A | * | 6/1939 | Critchlow | 108/33 |
| 2,601,177 A | * | 6/1952 | Smullen | 297/163 |
| 2,898,170 A | * | 8/1959 | Antonius | 108/45 |
| 3,394,666 A | * | 7/1968 | Pearlman | 108/129 |
| 3,554,139 A | * | 1/1971 | Rosner | 108/44 |
| 3,675,965 A | * | 7/1972 | Burdett | 296/156 |
| 3,709,159 A | * | 1/1973 | Oglesby, Jr. | 108/44 |
| 3,712,662 A | * | 1/1973 | Busby | 296/168 |
| 3,880,091 A | * | 4/1975 | Heinonen | 108/44 |
| 4,005,898 A | * | 2/1977 | Way | 296/174 |
| 4,452,151 A | * | 6/1984 | Jarrard | 108/44 |
| 4,455,948 A | * | 6/1984 | Torres | 108/44 |
| 4,494,465 A | * | 1/1985 | Fick, Jr. | 108/44 |
| 4,648,648 A | * | 3/1987 | Shigesada et al. | 296/37.16 |
| 4,887,526 A | * | 12/1989 | Blatt | 108/44 |
| 4,962,709 A | * | 10/1990 | Huber | 108/44 |
| 4,993,088 A | * | 2/1991 | Chudik | 5/118 |
| 5,039,155 A | | 8/1991 | Suman et al. | |
| 5,492,257 A | * | 2/1996 | Demick | 224/275 |
| 5,634,408 A | * | 6/1997 | Jarkowski | 108/44 |
| 5,709,329 A | * | 1/1998 | Johnson | 224/402 |
| 5,730,066 A | * | 3/1998 | Auten et al. | 108/44 |
| 5,992,331 A | | 11/1999 | Inoue et al. | |
| 6,050,202 A | * | 4/2000 | Thompson | 108/44 |
| 6,092,708 A | * | 7/2000 | Rand | 224/542 |
| 6,145,447 A | * | 11/2000 | Henderson | 108/44 |
| 6,250,702 B1 | * | 6/2001 | Eipper | 296/26.1 |
| 6,540,279 B1 | * | 4/2003 | Bargiel | 296/65.05 |
| 6,733,060 B1 | | 5/2004 | Pavkov et al. | |
| 6,811,196 B2 | | 11/2004 | Gammon | |
| 6,942,269 B2 | * | 9/2005 | Mains | 296/37.16 |
| 7,309,202 B1 | * | 12/2007 | Anderson | 414/537 |
| 7,377,569 B2 | * | 5/2008 | Taylor et al. | 296/37.6 |
| 7,398,737 B1 | * | 7/2008 | Martellaro | 108/44 |
| 7,661,742 B2 | | 2/2010 | Medlar et al. | |
| 7,938,471 B2 | | 5/2011 | Karaki et al. | |
| 7,950,712 B2 | | 5/2011 | Karaki et al. | |
| 7,966,950 B2 | * | 6/2011 | Volpe et al. | 108/44 |
| 8,172,295 B2 | * | 5/2012 | Fischer et al. | 296/24.43 |
| 2003/0090120 A1 | | 5/2003 | Barber et al. | |
| 2004/0056059 A1 | * | 3/2004 | Delgado et al. | 224/499 |
| 2007/0252401 A1 | | 11/2007 | Sumida et al. | |
| 2009/0146445 A1 | | 6/2009 | Bernhardsson et al. | |

* cited by examiner

*Primary Examiner* — Dennis Pedder
(74) *Attorney, Agent, or Firm* — Rankin Hill & Clark LLP (57) ABSTRACT

A cargo lid system for a vehicle includes a cargo lid body, a leg member and at least one support surface. The cargo lid body has a substantially planer upper surface and a lower surface opposite the upper surface. The leg member is movable relative to the lid body. The leg member is movable between an extended position wherein the leg member depends from the lid body to support the cargo lid assembly in an elevated position and a retracted positioned wherein the leg member folds against the lid body to arrange the lid body in a collapsed position. The at least one support surface is defined by a surrounding vehicle structure for supporting the lid body in the elevated position together with the leg member in the extended position.

18 Claims, 7 Drawing Sheets

CARGO LID SYSTEM FOR A VEHICLE

BACKGROUND

The present disclosure generally relates to a cargo lid system for a vehicle, and particularly relates to a cargo lid system for selectively covering a rear cargo area disposed inside a vehicle cabin.

Many vehicles have a rear cargo area disposed between the rearmost seats in the vehicle. Access to such a rear cargo area is usually through a tailgate of the vehicle. Sometimes the cargo area is simply floor space covered by a carpet or other vehicle surface treatment. Other times, a recessed compartment is defined in the floor of the vehicle behind the rearward seats for receiving articles for storage therein. Some vehicle manufacturers provide a removable cargo lid, typically rectangular in shape, for covering the recessed area and providing a floor surface generally aligned in elevation with a lower edge of the rear tailgate or tailgate opening. Such cargo lids typically sit on a supporting body structure along all four edges of the lid.

By way of example, one known arrangement uses a plastic molded tub disposed in the rear cargo area of the vehicle for defining the recessed storage compartment. A forward edge or flange of the tub is supported by a laterally extending steel structural support beam of the vehicle. Side flanges of the tub support side edges of the cargo lid. A rear edge of the cargo lid can be supported by the vehicle body adjacent the bumper area.

SUMMARY

According to one aspect, a cargo lid system for a vehicle includes a cargo lid body, a leg member and at least one support surface. The cargo lid body has a substantially planer upper surface and a lower surface opposite the upper surface. The leg member is movable relative to the lid body. The leg member is movable between an extended position wherein the leg member depends from the lid body to support the cargo lid assembly in an elevated position and a retracted positioned wherein the leg member folds against the lid body to arrange the lid body in a collapsed position. The at least one support surface is defined by a surrounding vehicle structure for supporting the lid body in the elevated position together with the leg member in the extended position.

According to another aspect, a vehicle cargo lid system includes a lid body, a leg member and at least one support surface. The lid body has an upper surface for presenting a flat surface over a rear cargo area of the vehicle when the lid body is in an elevated position. The leg member is arranged to support a leading edge of the lid body when the lid body is in the elevated position and the leg member is in a propped position. The leg member is foldable to a collapsed position to allow the lid body to rest against a floor of the rear cargo area. The at least one support surface is defined by a vehicle structure surrounding the rear cargo area for supporting another edge of the lid body when the lid body is in the elevated position.

According to a further aspect, a cargo lid assembly for a vehicle includes a lid body having a substantially planer upper surface and an opposite lower surface. The cargo lid assembly further includes a leg member pivotally mounted to the lid body. The leg member is movable between an extended position wherein the leg member depends from a forward edge of the lid body in approximate perpendicular relation to the upper surface and a collapsed position wherein the leg member is folded flat against the lid body in approximate zero degree relation to the upper surface.

DETAILED DESCRIPTION

Referring now to the drawings, wherein the showings are for purposes of illustrating one or more exemplary embodiments and not for purposes of limiting same, a cargo lid system is shown and generally designated by reference numeral 10 for a vehicle 12. The cargo lid system 10, which can also be referred to as a vehicle cargo lid system, includes a cargo lid assembly 14 comprising a lid body 16 and a leg member 18 movable relative to the lid body 16. The lid body 16 has a substantially planer upper surface 16a and a lower surface 16b opposite the upper surface 16a. The upper surface 16a presents a flat show surface over a rear cargo area 20 of the vehicle 12, particularly when the lid body 16 is in an elevated position (the position shown in FIGS. 1-3). The lid assembly 14 is configured to rest on a floor 22 of the cargo area 20 when in a collapsed or stowage position (the position shown in FIGS. 4-6) or can slide under the vehicle seat 44 when in the collapsed position.

As shown, the rear cargo area 20 can be a recessed cargo area 20 defined behind the rearmost seats in the vehicle 12 (e.g., behind seats 44) and the cargo lid assembly 14 can selectively cover the recessed cargo area 20 when in the elevated position. As will be described in more detail below, the movable leg member 18 is arranged to support a leading edge of the lid body 16 without the need for laterally extending structural support beam conventionally used to support leading edges of prior art cargo lids. In particular the leg member 18 is arranged to support a leading edge 16c of the lid body 16 when the lid body 16 is in the elevated position and the leg member 18 is in an extended or propped position.

The leg member 18 is foldable to a collapsed or retracted position (shown in FIGS. 4-6) to allow the lid body 16 to move to its corresponding collapsed or stowage position wherein the lid body 16 can rest against the floor 22 of the rear cargo area 20. In the embodiment illustrated in FIGS. 1-6, the movable leg member 18 is mounted to the lid body 16. Specifically, and as shown, the movable leg member 18 is pivotally attached to lid body 16 at or adjacent the forward edge 16c of the lid body 16. In this configuration, the leg member 18 is movable between the extended position (shown in FIGS. 1-3) wherein the leg member 18 is connected to the lid body 16 and depends therefrom to support the cargo lid assembly 14 in an elevated position and the retracted position (shown in FIGS. 4-6) wherein the leg member 18 folds against the lid body 16 in a collapsed position and allows the lid body 16 to rest on the floor 22. More specifically, the leg member 18 of FIGS. 1-8 is pivotally mounted to the lid body 16 for folding movement between the propped or extended position wherein the leg member 18 is substantially perpendicular relative to the upper surface 16a of the lid body 16 and the collapsed position wherein the leg member 18 is folded flat against the lid body 16 for presenting the lid body 16 and the leg member 18 together as a compact structure (see FIG. 8).

The cargo lid system 10 can further include at least one support surface (e.g., support surfaces 24, 26, 28 in the illustrated embodiment) defined by a surrounding vehicle structure for supporting the lid body 16 in the elevated position together with the leg member 18 in the extended position. In particular, the at least one support surface defined by the vehicle structure surrounding the rear cargo area 20 can be for supporting another edge, such as edges 16d, 16e, or 16f, of the lid body 16 when the lid body 16 is in the elevated position. Notably, the at least one support surface does not need to be provided at or along the leading edge 16c of the lid body 16, nor is any cross beam of the vehicle 12 required to support the leading edge 16c.

In the illustrated embodiment, leg member 18 can be accommodated within a recess 36 defined in the underside 16b of the lid body 16 when the leg member 18 is in the collapsed position. The recess 36 can have a depth greater than a width or thickness of the leg member 18 or a depth sufficient to fully accommodate the leg member 18 when in the retracted position such that the leg member 18 is retracted above the lower surface 16b of the lid body 16. This arrangement allows for the recess 36 to fully accommodate the leg member 18 when the leg member 18 is in the collapsed position. Accordingly, when the leg member 18 is in the collapsed position, the leg member 18 can be folded flat against the lid body 16 in approximate zero degree relation relative to the lid body 16, and particularly relative to one or both of the upper surface 16a and/or the lower surface 16b. At least in the illustrated embodiment, the leg member 18 is the only leg member that is mounted to the lid body 16. Specifically, the movable leg member 18 is oriented in perpendicular relation relative to the lid body 16 when in the extended position and arranged to support the leading edge 16c of the lid body 16 when in the extended position. The movable leg member can be oriented in approximate zero relation relative to the lid body 16 when in its retracted position.

In the illustrated embodiments, the leg member 18 includes a pair of laterally spaced apart leg portions 38, 40. In the embodiment of FIGS. 1-8, these leg portions 38, 40 are pivotally connected to the lid body 16 and depend from the lid body 16 when the leg member 18 is in the extended position. The leg member 18 also includes a base support portion 42 that spans between distal ends 38a, 40a of the leg portions 38, 40. The base support portion 42 can be spaced apart from a lid body 16 when the leg member 18 is in the extended position. As shown, proximal ends 38b, 40b of the leg portions 38, 40 are pivotally connected to the lid body 16 in the embodiment of FIGS. 1-8. Also as shown, the leg member 18 can be disposed at or adjacent the leading edge 16c of the lid body 16 and can be substantially perpendicular relative to the upper and lower surfaces 16a, 16b when in the extended position.

The at least one support surface of the cargo lid system 10 can include one or both of: a rear supporting portion and lateral supporting portions. The rear support portion can be spaced apart from a vehicle seat or seats 44 for supporting the trailing edge 16d of the lid body 16. Likewise, the lateral supporting portions can be spaced apart from the vehicle seats 44 for supporting the lateral edges 16e, 16f of the lid body 16. In particular, these support portions can support the lid body 16 when the lid body 16 is held in position adjacent the vehicle seats 44 while the lid assembly 14 is in the elevated position. In the illustrated embodiment, the at least one support surface of the cargo lid system includes both a rear supporting portion 24 and lateral supporting portions 26, 28.

More particularly, in the illustrated embodiment, the rear support portion 24 is spaced apart from the vehicle seats 44 (or seatbacks 44a, 44b) for supporting the trailing edge 16c of the lid body, at least when the leading edge 16c of the lid body is maintained in position adjacent the seats 44 when the lid assembly 14 is in the elevated position. The lateral supporting portions 26, 28 area also spaced apart from the vehicle seats 44, but a lesser amount than the rear supporting portion 24. The lateral supporting portions 26, 28 support the lateral edges 16e, 16f of the lid body 16, at least when the leading edge 16c of the lid body 16 is maintained in position adjacent the vehicle seats 44 when the lid assembly 14 is in the elevated position. Thus, the leading edge 16c of the lid body 16 is maintained in a position adjacent the vehicle seats 44 when the lid body 16 is in the elevated position and the lid body 16 extends away from the vehicle seats 44 to the trailing edge 16c and the rear supporting portion 24 when in the elevated position. As shown, the at least one support surface, for example, the rear and lateral support surfaces 24, 26, 28, can be elevated relative to the cargo floor 22 disposed behind the rear seats 44 in the vehicle 12.

In the embodiment illustrated in FIGS. 1-8, a brace or bracket member 50 can be disposed on the cargo floor 22 for receiving the leg member 18 when in its extended position. In particular, the brace member 50 can be a snap-fit member that removably or releasably receives the base support portion 42 of the leg member 18 to hold the leg member 18 in the extended position and maintain a longitudinal position of the lid body 16 when in the elevated position. As already discussed, leg member 18 includes the leg portions 38, 40 that together with the base support portion 42 form an inverted U-shape when the leg member 18 is in the extended position. The snap-fit bracket 50 can be particularly configured to releasably connect to a distal end portion of the leg member 18 (i.e., the base portion 42 in the illustrated embodiment) when the leg member 18 is in the extended position. The leg member 18 of the illustrated embodiment (FIGS. 1-8) further includes a mounting bar 52 mounted to the lid body 16 in recessed relation relative to the lower surface 16b. The leg portions 38, 40, and particularly proximal ends thereof 38b, 40b, can be pivotally received in the mounting bar 52 for pivotal movement relative thereto. Mounting bar 52 can also be removably receivable in the snap-fit member 50 to hold the leg member 18 and maintain a longitudinal position of the lid body 16 when in the collapsed position.

Figure 9:
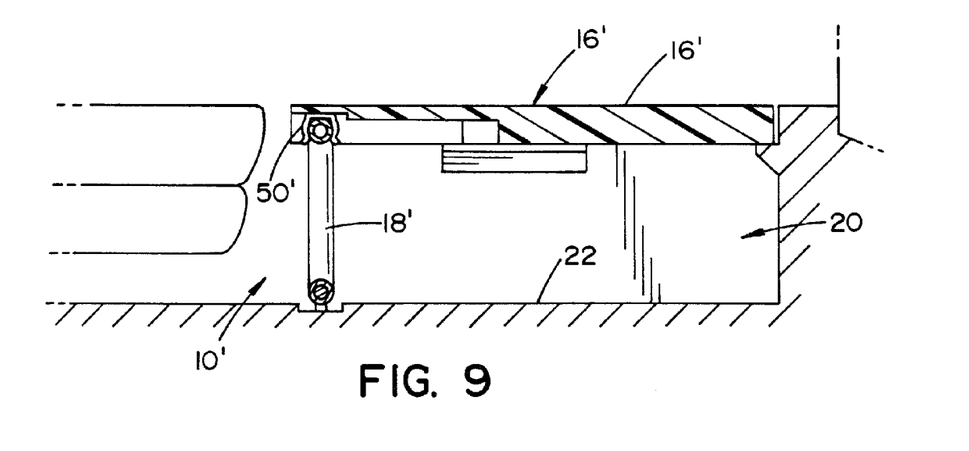
FIG. 9 is a cross-sectional view similar to FIG. 2 but of a cargo lid system according to an alternate embodiment wherein the movable leg member is pivotally connected to a cargo floor.
Figure 10:
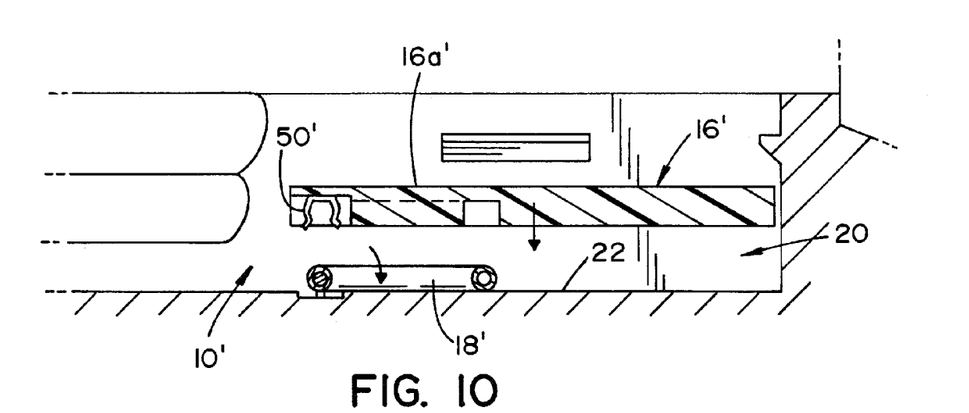
FIG. 10 is a cross-sectional view similar to FIG. 9 but showing the movable leg member folded down against the cargo floor.

More generally, the snap-fit bracket 50 can be mounted to either one of: the floor 22 of the rear cargo area 20 or the lid body 16. The leg member 18 would be pivotally mounted to the lid body 16 when a snap-fit bracket 50 is mounted to the floor 22 of the rear cargo area 20, as shown in FIGS. 1-8, or the leg member 18 could be mounted to the floor 22 of the rear cargo area 20 when snap-fit bracket 50' is mounted to lid body 16', as shown in FIGS. 9-10. Accordingly, FIGS. 9-10 illustrate a cargo lid system 10' including lid body 16' and leg member 18' movable relative to the lid body 16' and pivotally mounted to the floor 22 of the cargo area 20 for folding movement between a propped position (FIG. 9) wherein the leg member 18' is substantially perpendicular relative to upper surface 16a' of the lid body 16' and the collapsed position (FIG. 10) wherein the leg member 18' is folded flat against the floor 22 of the rear cargo area 20. In most other respects, the leg member 18' of FIGS. 9-10 is the same or similar to the leg member 18 of FIGS. 1-8, and likewise the cargo lid system 10' is the same or similar to the lid system 10 such that no further discussion is deemed necessary as the foregoing will be appreciated and understood by those of ordinary skill in the art.

Figure 1:
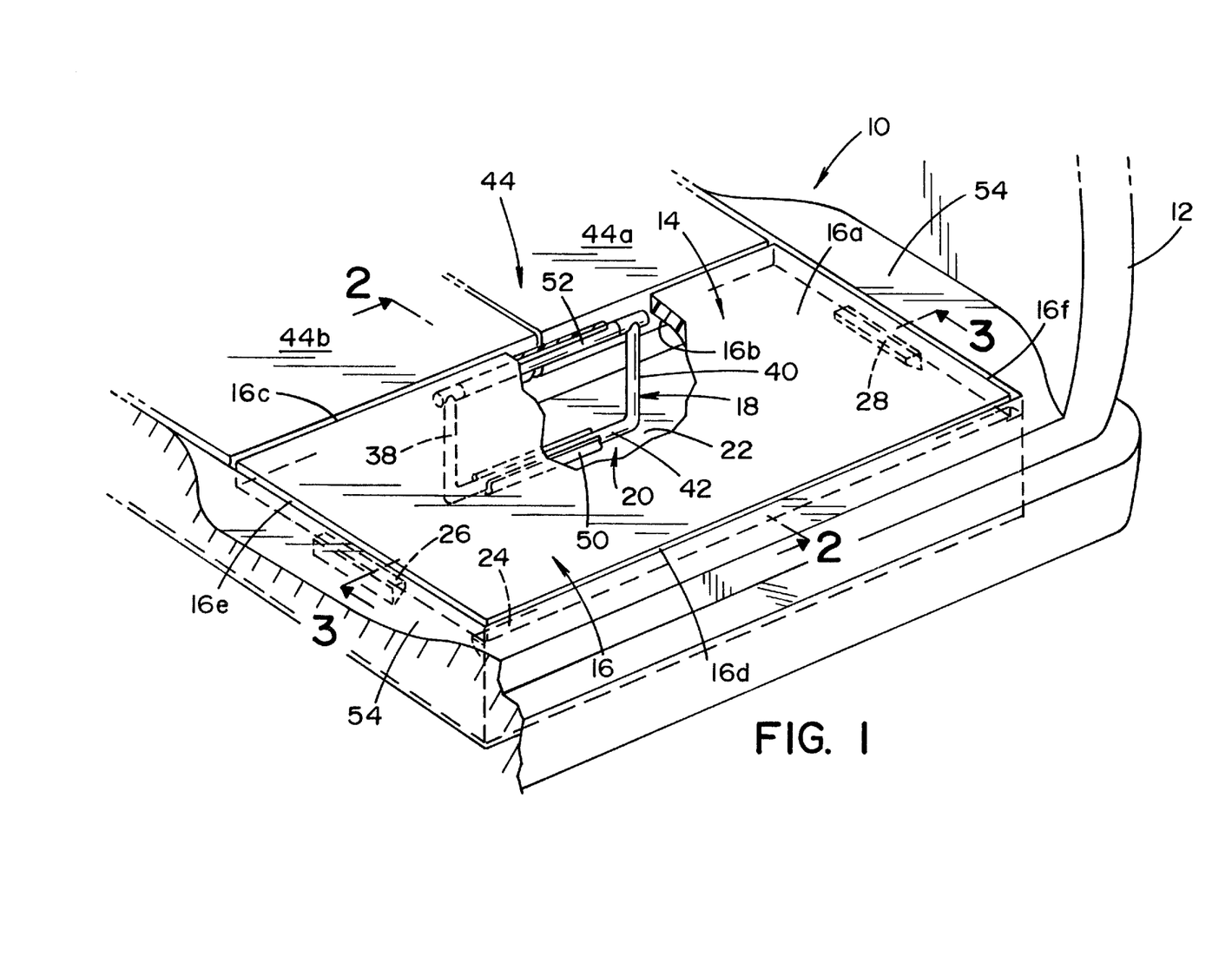
FIG. 1 is a partial perspective view of a cargo lid system for a vehicle including a cargo lid body and a movable leg member supporting the lid body in an elevated position.
Figure 2:
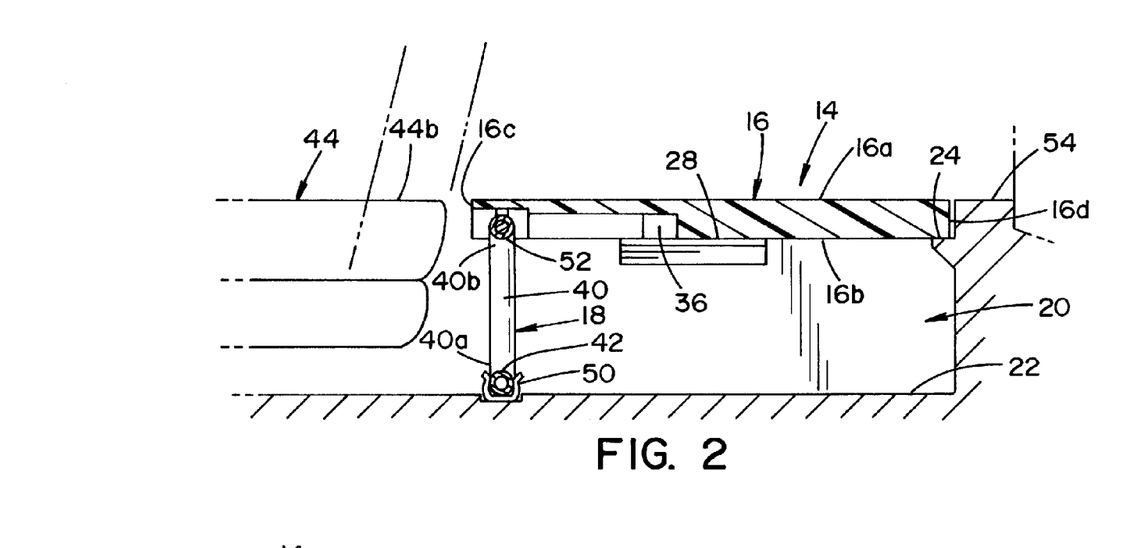
FIG. 2 is a cross-sectional view of the cargo lid system taken along the line 2-2 of FIG. 1.
Figure 3:
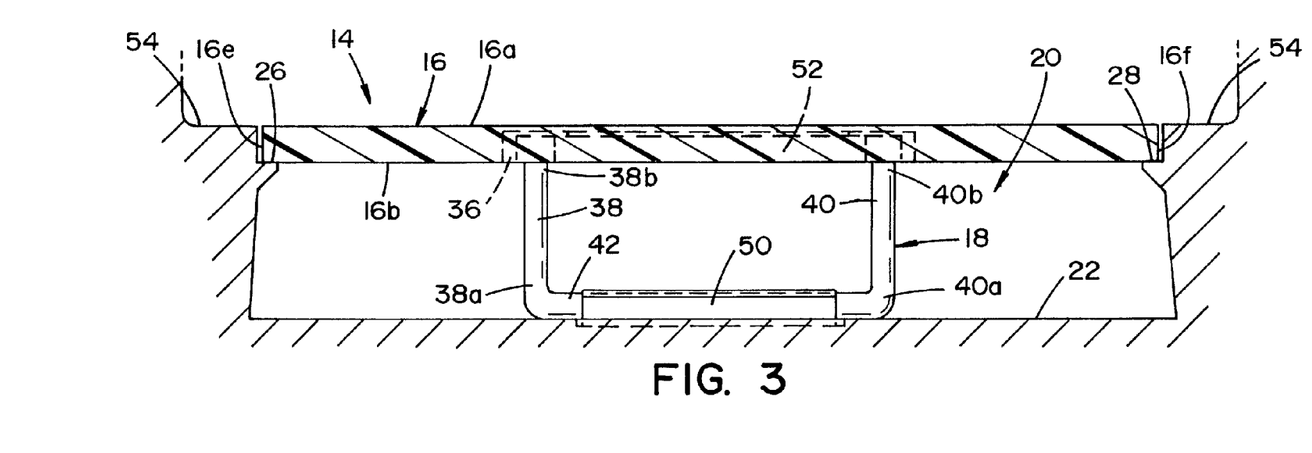
FIG. 3 is another cross-sectional view of the cargo lid system, but taken across the line 3-3 of FIG. 1.
Figure 4:
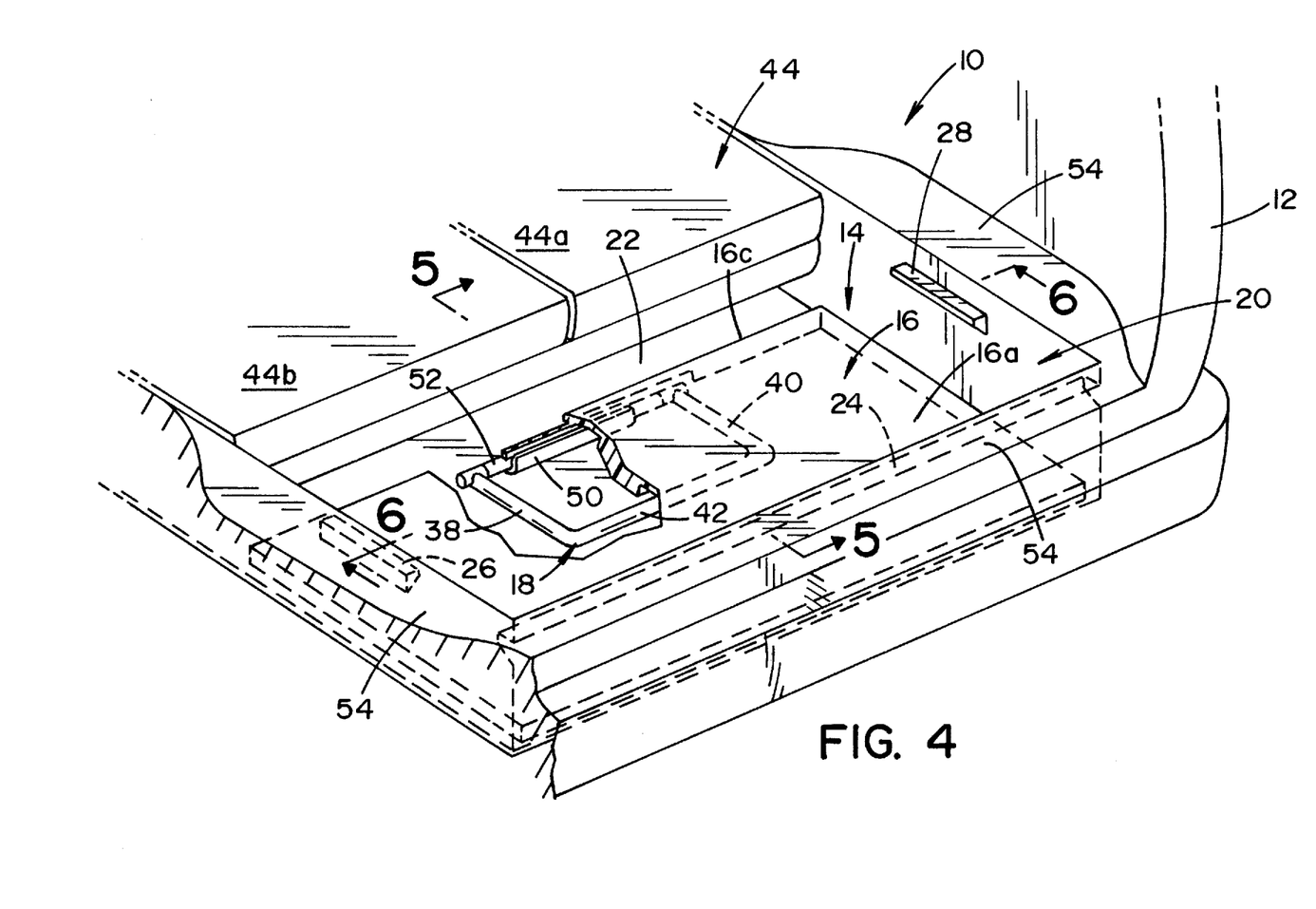
FIG. 4 is a partial perspective view similar to FIG. 1, but showing the lid body in a collapsed position with the leg member folded against a lower surface of the lid body.
Figure 5:
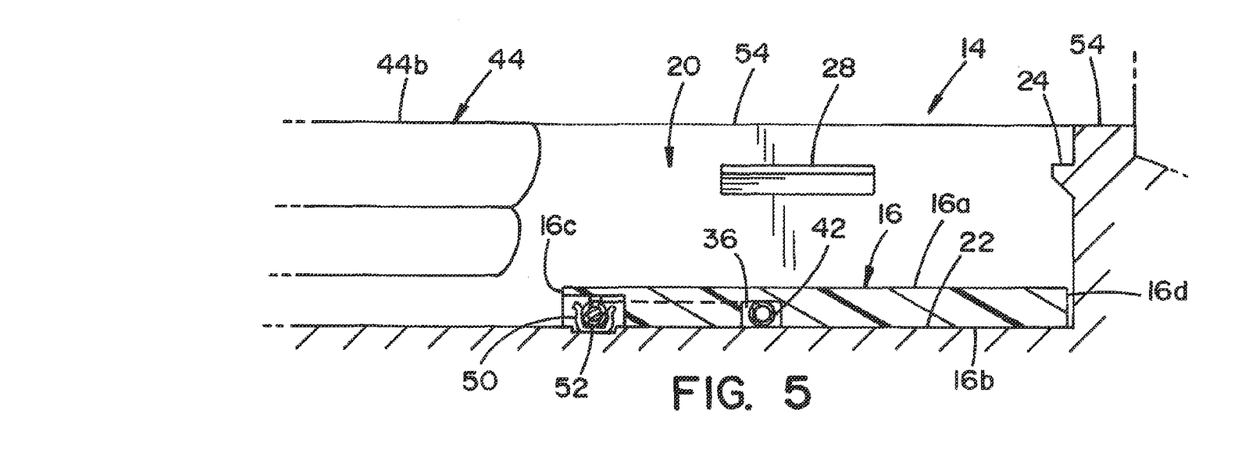
FIG. 5 is a cross-sectional view of the cargo lid system taken along the line 5-5 of FIG. 4.
Figure 6:
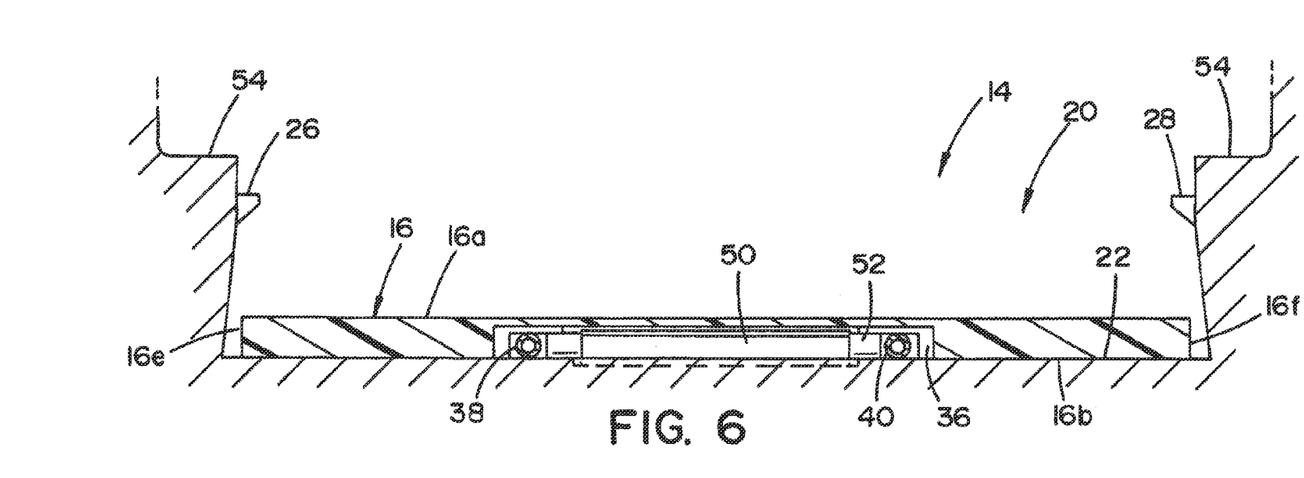
FIG. 6 is another cross-sectional view of the cargo lid system, but taken along the line 5-5 of FIG. 4.
Figure 7:
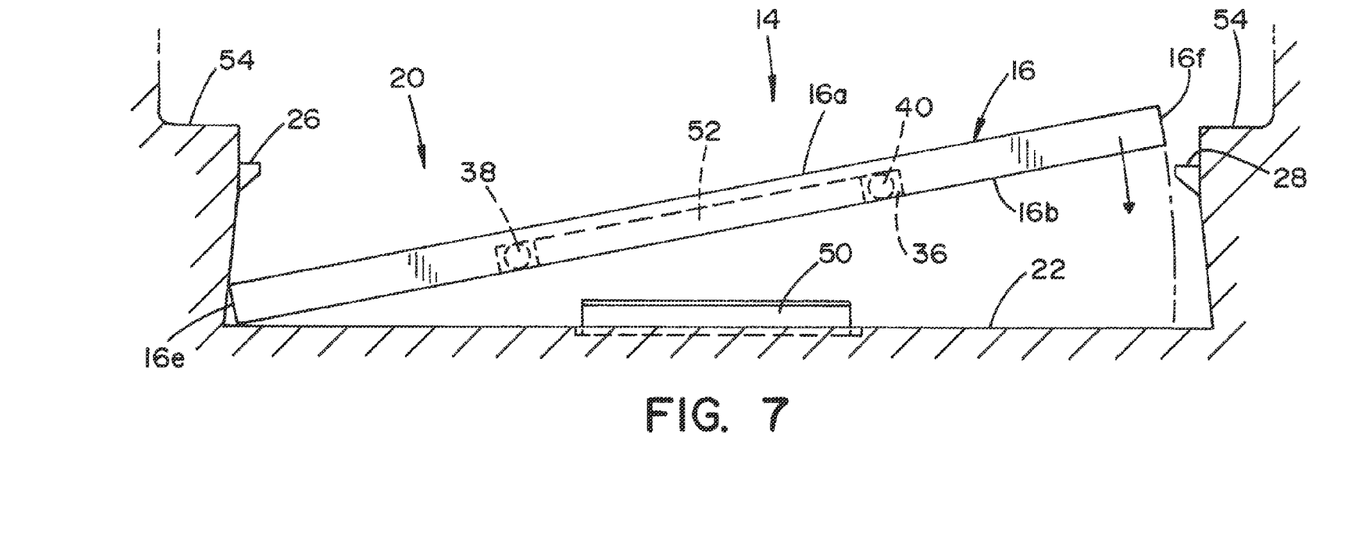
FIG. 7 is a lateral cross-sectional view of the vehicle showing the lid body with the leg member folded thereagainst being moved from the elevated position to the collapsed position.
Figure 8:
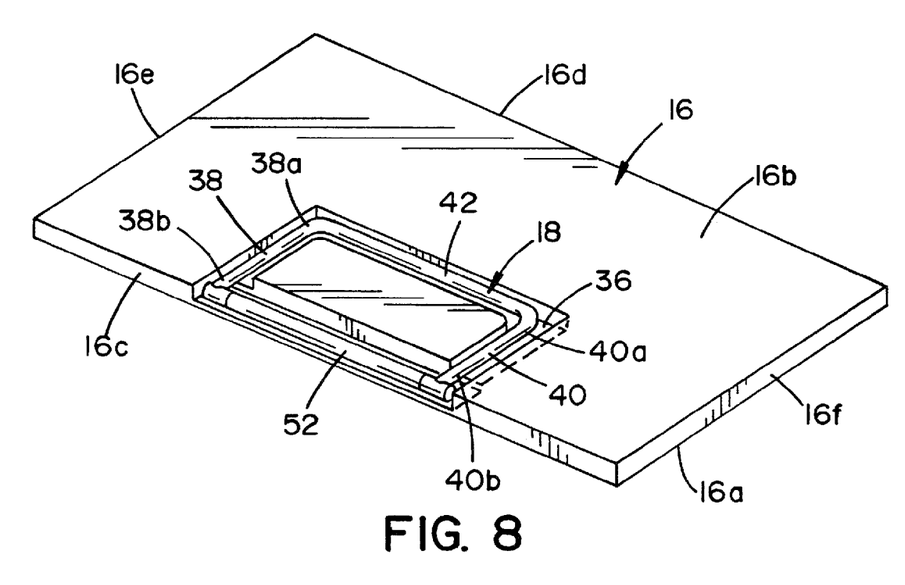
FIG. 8 is a perspective view showing the cargo lid in isolation with the leg member folded flat thereagainst.

In operation, and with particular reference to the embodiment shown in FIGS. 1-8, the leg member 18 can moved to its propped or extended position shown in FIGS. 1-3 and the rear edge 16d of the lid body 16 is rested upon the supporting surface 24 and the lateral edges 16e, 16f are rested on the respective lateral side support surfaces 26, 28. In this configuration, the upper surface 16a is generally flush with a surrounding floor surface 54 of the vehicle 12 and, as shown best in FIG. 1, can present a substantially flush and planer surface together with the seatbacks 44a, 44b of the vehicle seats 44 when such seats are folded flat into stowage positions. The base portion 42 of the leg member 18 can be releasably secured in the snap-fit member 50 for securing the position of the lid body 16 within the vehicle 12. Notably, no structural cross brace or other supporting member is provided at or along the forward edge 16c of the lid body 16.

Figure 5A:
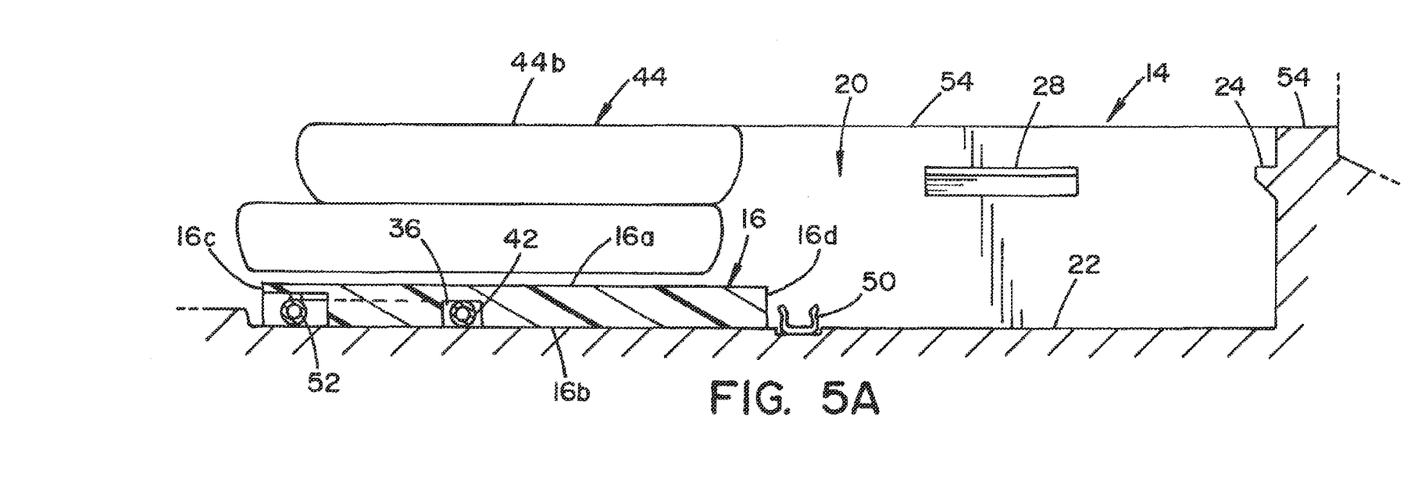
FIG. 5a is a view of the cargo lid system in the collapsed position slid beneath the vehicle seats.

When desired, the leg member 18 can be folded flat against the underside 16b of the lid body 16 and into the recess 36 defined therein. In this configuration, the lid body 16 with the leg member 18 folded or collapsed thereagainst, can be removed from the support surfaces 24, 26, 28 and stowed flat against the floor 22 thereby allowing the rear cargo area 20 to receive more cargo. If desired, the lid body 16 with the leg member 18 collapsed thereagainst can be slid beneath the vehicle seats 44 (see FIG. 5a). When the leg member 18 is mounted to the floor 22 instead of the lid body 16, operation is substantially the same but the movable leg 18 is detached from the bracket 50 on the lid body 16 and folded flat against the floor 22 when desired to remove or collapse the lid body 16.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A cargo lid system for a vehicle, comprising:
   a cargo lid body having a substantially planar upper surface and a substantially planar lower surface opposite the upper surface, and further having a leading or forward edge and a trailing or rear edge;
   a leg member movable relative to the lid body, the leg member movable between an extended position wherein the leg member depends from the lid body to support the lid body in an elevated position wherein the leading edge of the lid body is adjacent a seat back of a vehicle rear seat and a retracted position wherein the leg member folds against the lid body to arrange the lid body in a collapsed position, the leg member including a pair of laterally spaced apart leg portions disposed at or adjacent a central portion of the leading edge and oriented substantially perpendicular relative to the upper and lower surfaces when in the extended position, wherein a recess is defined in the lower surface of the lid body for accommodating the leg member when in the retracted position; and
   at least one support surface defined by a surrounding vehicle structure for supporting the lid body in the elevated position together with the leg member in the extended position;
   wherein the lid body covers a recessed cargo area defined in a floor surface behind the vehicle seat back when in the elevated position, the lid body configured to rest on a floor of the recessed cargo area when in the collapsed position or to slide under the vehicle seat when in the collapsed position.

2. The cargo lid system of claim 1 wherein the recess has a depth sufficient to fully accommodate the leg member when in the retracted position such that the leg member is retracted above the lower surface of the lid body.

3. The cargo lid system of claim 1 wherein the leg portions depend from the lid body when the leg member is in the extended position connected to a base support portion that spans between distal ends of the leg portions, the base support portion spaced apart from the lid body when the leg member is in the extended position, and wherein proximal ends of the leg portions are pivotally connected to the lid body.

4. The cargo lid system of claim 1 wherein the at least one support surface includes one or both of:
   a rear supporting portion spaced apart from a vehicle seat back for supporting the trailing edge of the lid body, the leading edge of the lid body maintained in a position adjacent the vehicle seat back when in the elevated position and the lid body extending away from the vehicle seat back to the trailing edge and the rear supporting portion when in the elevated position; and
   lateral supporting portions spaced apart from a vehicle seat back for supporting lateral edges of the lid body when the leading edge of the lid body is maintained in the position adjacent the vehicle seat back when the lid body is in the elevated position.

5. The cargo lid system of claim 4 wherein the at least one support surface includes both the rear supporting portion and the lateral supporting portions.

6. The cargo lid system of claim 1 wherein the leg member is mounted to the lid body and is the only leg member mounted to the lid body, the movable leg member oriented in perpendicular relation relative to the lid body when in the extended position and arranged to support the leading edge of the lid body when in the extended position, the leg member oriented in about zero degree relation relative to the lid body when in the retracted position.

7. The cargo lid system of claim 6 wherein the movable leg member is pivotally attached to the lid body at or adjacent the forward edge of the lid body.

8. The cargo lid system of claim 1 wherein the at least one support surface is elevated relative to a cargo floor disposed behind the rear seat in the vehicle and further wherein a brace member is disposed on the cargo floor for receiving the leg member when in the extended position.

9. The cargo lid system of claim 8 wherein the brace member is a snap fit member that removably receives a base support portion of the leg member to hold the leg member in the extended position and maintain a longitudinal position of the lid body when in the elevated position.

10. The cargo lid system of claim 9 wherein the leg portions together with the base support portion form a U-shape when the leg member is in the extended position, the leg member further including a mounting bar mounted to the lid body in recessed relation relative to the lower surface, the leg portions having proximal end portions pivotally received in the mounting bar for pivotal movement relative thereto, the mounting bar also removably receivable in the snap fit member to hold the leg member and maintain a longitudinal position of the lid body when in the collapsed position.

11. A vehicle cargo lid system, comprising:
a lid body having an upper surface for presenting a flat surface over a rear cargo area of the vehicle when the lid body is in an elevated position;
a leg member arranged to support a leading edge of the lid body when the lid body is in the elevated position and the leg member is in a propped position, the leg member foldable to a collapsed position to allow the lid body to rest against a floor of the rear cargo area; and
at least one support surface defined by a vehicle structure surrounding the rear cargo area for supporting another edge of the lid body when the lid body is in the elevated position, wherein the at least one support surface includes both a rear supporting portion and lateral supporting portions, the rear supporting portion spaced apart from a vehicle seat back for directly engaging and supporting a trailing edge of the lid body, the lateral supporting portions spaced apart from a vehicle seat back for directly engaging and supporting lateral edges of the lid body.

12. The vehicle cargo lid system of claim 11 wherein the leg member is pivotally mounted to the lid body for folding movement between the propped position wherein the leg member is substantially perpendicular relative to the upper surface of the lid body and the collapsed position wherein the leg member is folded flat against the lid body for presenting the lid body and leg member together as a compact structure.

13. The vehicle cargo lid system of claim 11 wherein the leg member is pivotally mounted to the floor of the rear cargo area for folding movement between the propped position wherein the leg member is substantially perpendicular relative to the upper surface of the lid body and the collapsed position wherein the leg member is folded flat against the floor of the rear cargo area.

14. The vehicle cargo lid system of claim 11 wherein the leg member is accommodated within a recess defined in an underside of the lid body when in the collapsed position, the recess having a depth greater than a width of the leg member.

15. The vehicle cargo lid system of claim 11 further including a snap fit bracket for releasably securing the leg member, the snap fit bracket configured to releasably connect to a distal end portion of the leg member when the leg member is in the propped position.

16. The vehicle cargo lid system of claim 15 wherein the snap fit bracket is mounted to one of: the floor of the rear cargo area or the lid body, the leg member is pivotally mounted to the lid body when the snap fit bracket is mounted to the floor of the rear cargo area, the leg member mounted to the floor of the rear cargo area when the snap fit bracket is mounted to the lid body.

17. A cargo lid assembly for a vehicle, comprising:
a lid body having a substantially planar upper surface and an opposite lower surface;
a leg member pivotally mounted to the lid body via a lid support portion mounted to the lid body, the leg member movable between an extended position wherein the leg member depends from a forward edge of the lid body in approximate perpendicular relation to the upper surface and a collapsed position wherein the leg member is folded flat against the lid body in approximate zero degree relation to the upper surface; and
a brace member disposed on a cargo floor for removably receiving a base support portion of the leg member when in the extended position, the lid support portion also removably receivable in the brace member to hold the leg member in the collapsed position.

18. The cargo lid assembly of claim 17 wherein a recess is defined in the opposite surface of the lid body that fully accommodates the leg member when in the collapsed position.

* * * * *